(12) United States Patent
Wang

(10) Patent No.: US 10,367,392 B2
(45) Date of Patent: Jul. 30, 2019

(54) ROTARY MAGNETIC TRANSMISSION STRUCTURE

(71) Applicant: Zhongming Wang, Nan Ning (CN)

(72) Inventor: Zhongming Wang, Nan Ning (CN)

( * ) Notice: Subject to any disclaimer, the term of this patent is extended or adjusted under 35 U.S.C. 154(b) by 972 days.

(21) Appl. No.: 14/778,645

(22) PCT Filed: Jul. 29, 2013

(86) PCT No.: PCT/CN2013/080353
§ 371 (c)(1),
(2) Date: Sep. 21, 2015

(87) PCT Pub. No.: WO2014/161254
PCT Pub. Date: Oct. 9, 2014

(65) Prior Publication Data
US 2016/0049846 A1    Feb. 18, 2016

(30) Foreign Application Priority Data
Apr. 1, 2013    (CN) .......................... 2013 1 0109423

(51) Int. Cl.
*H02K 49/00* (2006.01)
*H02K 7/00* (2006.01)
*H02K 49/10* (2006.01)

(52) U.S. Cl.
CPC ........... *H02K 7/003* (2013.01); *H02K 49/102* (2013.01)

(58) Field of Classification Search
CPC .............................. H02K 7/003; H02K 49/102
(Continued)

(56) References Cited

U.S. PATENT DOCUMENTS 5,569,967 A * 10/1996 Rode .................... H02K 1/2733
                                                          310/103
6,837,295 B2    1/2005 Wang
(Continued)

FOREIGN PATENT DOCUMENTS

CN           1932229 A     3/2007
CN           102035352  *  4/2011  ............. H02K 49/00
(Continued)

OTHER PUBLICATIONS

Machine Translation for CN 102035352, Oct. 16, 2018.*
International Search Report; PCT/CN2013/080353; International Filing Date: Jul. 29, 2013; 2 pgs.

*Primary Examiner* — Hanh N Nguyen
(74) *Attorney, Agent, or Firm* — Schmeiser, Olsen & Watts, LLP

(57) ABSTRACT

A rotary magnetic transmission structure that can achieve stable transmission is provided. Two magnetic members having radial magnetic fields are fixed on each shaft of two parallel shafts A and B; the radial magnetic fields of the two co-axial magnetic members both spread at an angle greater than 60 degrees and less than 90 degrees; using the first magnetic members of each shaft A and B as references, the direction of opening of the angle between the radial magnetic field of the second magnetic member and the radial magnetic field of the co-axial first magnetic member on the same shaft is opposite to that on the other shaft. This structure can obviously reduce the peak effect at the two poles of the magnetic fields of the magnetic members between the two shafts, so that the transmission is stable during non-contact rotary transmission.

3 Claims, 1 Drawing Sheet

(58) Field of Classification Search
USPC .................. 310/103, 102 R, 156.01–156.84
See application file for complete search history.

(56) References Cited

U.S. PATENT DOCUMENTS

| | | | | |
|---|---|---|---|---|
| 8,346,131 B2 * | 1/2013 | Kim | ..................... | G03G 15/757 |
| | | | | 310/103 |
| 2005/0028628 A1 * | 2/2005 | Liue | ..................... | H02K 49/102 |
| | | | | 74/431 |
| 2011/0273037 A1 * | 11/2011 | Ota | ..................... | H02K 1/2733 |
| | | | | 310/50 |

FOREIGN PATENT DOCUMENTS

| | | |
|---|---|---|
| CN | 102035352 A | 4/2011 |
| CN | 201797467 U | 4/2011 |
| CN | 102832854 A | 12/2012 |
| CN | 202835196 U | 3/2013 |
| CN | 103151897 A | 6/2013 |
| CN | 203326849 U | 12/2013 |

\* cited by examiner

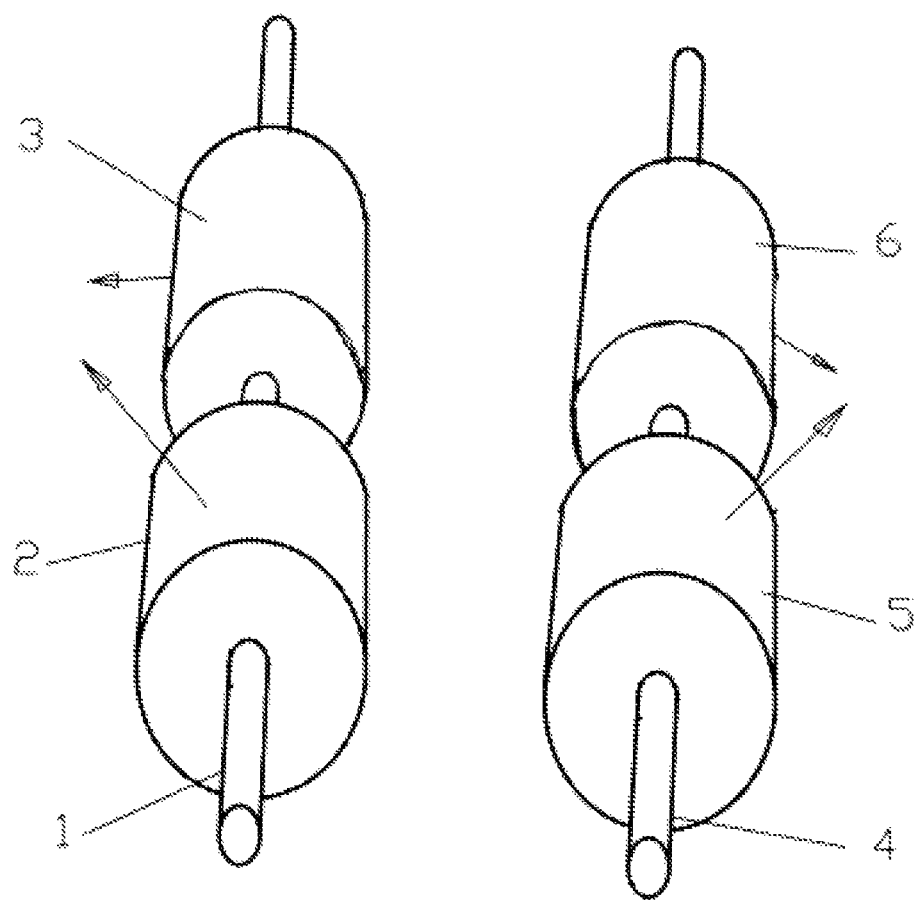

US 10,367,392 B2

ROTARY MAGNETIC TRANSMISSION STRUCTURE

CROSS-REFERENCE TO RELATED APPLICATIONS

This application claims priority to PCT Application No. PCT/CN2013/080353, having a filing date of Jul. 29, 2013, based on CN 2013 1010 9423.2, having a filing date of Apr. 1, 2013, the entire contents of which are hereby incorporated by reference.

FIELD OF TECHNOLOGY

This following relates to a rotary magnetic transmission structure, in particular to a rotary magnetic transmission structure for carrying out stable large-torque transmission at low speed through double parallel shafts spaced at a certain distance.

BACKGROUND

At present, magnetic transmission is utilized to carry out non-contact transmission in many fields. One of the magnetic transmission structures is called rotary magnetic field structure, where the magnetic transmission is carried out through two columnar magnetic members which are spaced at a certain distance to rotate in parallel. This kind of magnetic transmission structure is introduced in the Chinese patent 001184423 <Manufacturing Method for Magnetic Transmission System of Adjustable Curtain in Hollow or Double-Layer Glass> and the U.S. patent with the patent number U.S. Pat. No. 6,837,295 <MAGNETIC TRANSMISSION FOR AN ADJUSTABLE CURTAIN DISPOSED IN A DOUBLE PANE WINDOW>. It can be seen from the actual use that since the magnetic field directions of the two single columnar magnetic members are both radial, the transmission cycle with the torque value increases from zero to the max appear twice in one circle of rotary transmission, which sometimes leads to a large bounce in the transmission. This phenomenon is particularly obvious during large-torque transmission at low speed which limits the application range of the structure. Later, in order to overcome this defect, a magnetic transmission group composed of multiple radial magnetic fields is disclosed in the Chinese patent application 201020275394.9 <A Rotary Magnetic Transmission Structure>, and the magnetic field direction of each magnet and the magnetic field direction of an adjacent and coaxial magnet spread to form an angle ranging from 45 degrees to 60 degrees. As proven in practice, an unstable shaking phenomena may still exist during transmission in this structure.

SUMMARY

An aspect relates to a rotary magnetic transmission structure for stable transmission, where, a shaft A and a shaft B are parallel to each other, two magnetic members with radial magnetic fields are fixedly arranged on each shaft, and the radial magnetic field directions of the two coaxial magnetic members span an included angle larger than 60 degrees and smaller than 90 degrees; with the first magnetic members of shaft A and shaft B serving as references, the spreading direction of the included angle formed by the radial magnetic field direction of the second magnetic member and the radial magnetic field direction of the coaxial first magnetic member is opposite to that of the other shaft. By means of this structure, the peak influence of the two poles of the magnetic fields of the magnetic members between the two shafts is obviously reduced, and stable transmission during non-contact rotation can be achieved.

In order to solve the technical problem, the following two basic structures are adopted in the technical solution of embodiments of the present invention:

1. A transmission mode where the included angles formed by the radial magnetic fields of the two magnetic members on the same shaft is different from that of the other shaft. Transmission shaft A and transmission shaft B are arranged in parallel, wherein the two magnetic members with the radial magnetic fields are fixedly arranged on shaft A, and the included angle of the radial magnetic fields of two magnetic members is perpendicular to the axis and is between 60 degrees and 75 degrees; two corresponding magnetic members are fixedly arranged on shaft B, the included angle of the radial magnetic fields of the two magnetic members is between 75 degrees and 90 degrees. The spreading direction of the included angle formed by the radial magnetic fields of the two magnetic members of shaft B is opposite to that of shaft A. Therefore, the influence of the radial magnetic field peak on the rotary transmission is well reduced, and the transmission is stable during non-contact rotation.

2. A transmission mode where the included angles formed by the radial magnetic fields of the two magnetic members on the same shaft is different from that of the other shaft. Transmission shaft A and transmission shaft B are arranged in parallel, wherein two magnetic members are fixedly arranged on shaft A, and the directions of the radial magnetic fields of the magnetic parts spread clockwise to form an included angle between 60 degrees and 90 degrees, two corresponding magnetic members are fixedly arranged on shaft B, and the included angle formed by spreading the magnetic field directions of the radial magnetic fields of the magnetic members anticlockwise is the same as that of shaft A. Therefore, the influence of the radial magnetic field peak on the rotary transmission is well reduced, and the transmission is stable during non-contact rotation.

The rotary magnetic transmission structure has the advantages of achieving stable rotary transmission and meanwhile achieving the aim of carrying out stable large-torque transmission in narrow and long spaces by additionally arranging multiple groups in the parallel connection mode.

Due to the fact that the magnetic force direction of the radial magnetic field for each magnetic member fixed to the corresponding transmission shaft is different to that of the adjacent magnetic member, in order to reduce the mutual interference of the magnetic force, the magnetic members are spaced at a certain distance.

Spacers arranged between the magnetic members are non-magnetic objects.

The magnetic members can be arranged on shaft sleeves with inner polygons.

The magnetic members can be arranged on polygonal rotating shafts.

BRIEF DESCRIPTION

Some of the embodiments will be described in detail, with reference to the following figures, wherein like designations denote like members, wherein:

FIG. 1 is a basic structure diagram of the embodiment.

In FIG. 1, 1. transmission shaft A; 2. the first magnetic member with a radial magnetic field on shaft A; 3. the second magnetic member with a radial magnetic field on shaft A; 4. transmission shaft B; 5. the first magnetic member with a radial magnetic field on shaft B; 6. the second magnetic member with a radial magnetic field on shaft B; arrows on the magnetic members show the magnetic field directions of the radial magnetic fields.

DETAILED DESCRIPTION

Referring to FIG. 1, Fixedly arranged on a transmission shaft A is a first magnetic member 2 with a radial magnetic field and a second magnetic member 3 with a radial magnetic field spaced at a certain distance, wherein the direction of the radial magnetic field of the second magnetic member 3 spreads anticlockwise from the direction of the radial magnetic field of the first magnetic member 2 to form a 60-degree angle. Accordingly, fixedly arranged on shaft B is a first magnetic member 5 with a radial magnetic field, and a second magnetic member 6 with a radial magnetic field spaced at a certain distance, wherein the direction of the radial magnetic field of the second magnetic member 6 spreads clockwise from the direction of the radial magnetic field of the first magnetic member 5 to form a 90-degree angle.

During work, the transmission shaft A and transmission shaft B keep a certain distance in parallel. No matter whether shaft A or shaft B is driven to rotate, the other shaft can be driven to rotate stably and synchronously under the effect of magnetic force, thus achieving the aim of rotary transmission.

In practical use, these rotary magnetic transmission structures can provide desirable rotation torque when separated a certain distance, and accordingly have more favorable application prospects in situations where transmission cannot be directly performed. For example, this structure can be applied in control of various curtains in hollow glass, chemical industry, and other fields related to non-contact rotary transmission control.

What is claimed is:

1. A rotary magnetic transmission structure, comprising a shaft A and a shaft B parallel to each other, wherein two magnetic members with radial magnetic fields are fixedly arranged on each shaft, wherein an included angle formed by the radial magnetic fields of the two magnetic members on one shaft is different from that on the other shaft, and an included angle formed by the radial magnetic fields of the two magnetic members on one shaft is between 60 degrees and 75 degrees, while an included angle formed by the radial magnetic fields of the two magnetic members on the other shaft is between 75 degrees and 90 degrees, and a spreading direction of the included angle which is spreading from a radial magnetic field direction of a second magnetic member to a radial magnetic field direction of coaxial first magnetic member of one shaft is opposite to that of the other shaft.

2. The rotary magnetic transmission structure of claim 1, wherein the two magnetic members on each shaft are spaced at a certain distance.

3. The rotary magnetic transmission structure of claim 1, wherein the magnetic members can be arranged on polygonal rotating shafts.

* * * * *